United States Patent [19]

Audibert et al.

[11] Patent Number: 5,597,783
[45] Date of Patent: Jan. 28, 1997

[54] DRILLING PROCESSES AND FLUID USED IN WELL DRILLING APPLICATIONS

[75] Inventors: Annie Audibert, Le Vesinet; Jean-François Argillier, Suresnes; Jacqueline Lecourtier, Rueil Malmaison, all of France; Louise Bailey, Comberton Cambridge; Paul I. Reid, Cambridgeshire, both of Great Britain

[73] Assignees: Institut Francais du Petrole, Rueil Malmaison, France; Dowell Schlumberger, Inc., Sugarland, Tex.

[21] Appl. No.: 433,958

[22] Filed: May 4, 1995

[30] Foreign Application Priority Data

May 4, 1994 [FR] France ................. 94 05488

[51] Int. Cl.⁶ .................. C08L 33/08; C09K 7/02
[52] U.S. Cl. .................. 507/120; 507/224; 507/225; 507/117; 507/119; 507/216
[58] Field of Search .................. 507/120, 224, 507/225

[56] References Cited

U.S. PATENT DOCUMENTS

| 4,529,523 | 7/1985 | Landoll | 252/8.55 D |
| 4,670,501 | 2/1987 | Dymond et al. | 507/120 |
| 5,208,216 | 5/1993 | Williamson et al. | 507/120 |

FOREIGN PATENT DOCUMENTS

93/15164  8/1993  WIPO.

*Primary Examiner*—David B. Springer
*Attorney, Agent, or Firm*—Millen, White, Zelano, & Branigan, P.C.

[57] ABSTRACT

A water-base fluid of optimized composition for solving problems encountered during operations such as drilling, completion or workover operations in a well crossing at least one permeable geologic formation contains (i) a hydrophilic/hydrophobic polymer, (ii) an acrylamide-base polymer of hydrophobic unit, (iii) a hydrophobically modified cellulose derivative, and (iv) a polysaccharide type polymer.

The fluid can be used in a process implemented in a well drilled through at least one formation having a given permeability and is for particular application to slim-hole and/or deviated drilling.

24 Claims, No Drawings

DRILLING PROCESSES AND FLUID USED IN WELL DRILLING APPLICATIONS

FIELD OF THE INVENTION

The present invention relates to a water-base fluid of optimized composition for solving problems encountered during operations such as drilling, completion or workover operations in a well crossing at least one permeable geologic formation.

BACKGROUND OF THE INVENTION

What is referred to as a completion operation relates to operations of preparation or outfitting necessary for bringing a geologic formation into production from the wellbore. These completion operations use particular fluids called completion fluids.

What is referred to as a workover operation relates to an operation performed in a producing or a potentially producing well. Workover fluids can be used in the producing well in circulation in a comparable way to drilling fluids or in the form of a spacer fluid.

All these drilling, completion or workover fluids have in common the physico-chemical adaptation of their formulation to the nature of the geologic formations with which they are in contact and to the main functions for which they are intended. In fact, it is well-known that the fluids used in a well generally have most of the following functions:

- maintenance of the stability of the well walls,
- controlled filtration in the permeable formations,
- good capacity for cleaning the bottom of the well in circulation,
- easy density control,
- temperature stability and stability in time,
- no or little change in properties through contamination by clays or electrolytes,
- easy manufacture and treatment, etc.

In order to achieve these complex combined functions which may be incompatible, the relative quantities of additives must be selected and adjusted. To that effect, according to the nature of the problems encountered in the geologic formations, to their bottomhole conditions, such as pressure and temperature, and according to the main functions essential to the fluid, the composition of the well fluid is generally the result of a compromise between several functions and the cost of the essential additives.

SUMMARY OF THE INVENTION

The fluid according to the invention is a formulation containing in aqueous solution a hydrophilic/hydrophobic polymer called Hb1 and described in document FR-2,686,892, related to document PCT/FR-93/00,090, published under number WO 93/15,164. The polymer Hb1 is defined in these documents as having a structure of the -(Hb)-(Hy)- type with a statistical distribution, said structure resulting from the radical polymerization of ethylene monomers containing carboxylic functions, notably an $C_1$–$C_{30}$ acrylate/alkylacrylate copolymer corresponding to the following formula:

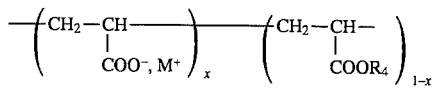

where x ranges between 0.4 and 0.8, where M is H or Na or K or any other monovalent ion, $R_4$ is $C_1$–$C_{30}$ alkyl, aryl or alky-aryl radical, and where the length of the hydrophobic units $R_4$ is selected as a function of the molecular mass of said polymer according to the following rules:

for a polymer having a molecular mass less than about $10^5$ daltons, $R_4$ contains at least two carbon atoms, for a polymer having a molecular mass ranging between about $10^5$ and $2.5\ 10^6$ daltons, $R_4$ contains at least four carbon atoms.

In a variant, the polymer Hb1 takes the name of H3 when the value of x is 0.8, when $R_4$ contains four carbon atoms and when the molecular mass of the polymer ranges between $10^4$ and $5\ 10^4$ daltons, and is preferably close to $1.7\ 10^4$ daltons.

The fluid according to the invention also includes a hydrophobically modified cellulose derivative. In a first variant of the invention, the cellulose derivative is hydrophobically modified hydroxyethylcellulose (HM HEC).

Hydrophobically modified cellulose derivatives mainly derive from cellulose derivatives which are conventionally used, such as carboxymethylcellulose (CMC), hydroxyethylcellulose (HEC) or hydroxypropylcellulose (HPC). These derivatives can be chemically modified through the incorporation of alkyl groups by a chemical reaction affecting certain cellulose units. These hydrophobically modified cellulose derivatives, notably HM HEC, HM CMC, HM HPC are described in document EP-A1-465,992.

The polymer HM HEC or hydrophobically modified hydroxyethylcellulose has been described in document U.S. Pat. No. 4,228,277 and in the publication "Synthesis and solution properties of hydrophobically modified hydroxyethy-lccllulose" by A.C. SAU and L.M. LANDOLL, in "Polymers in aqueous media: performance through association", J.E. Glass (Ed), Adv. Chem. Ser. 213, ACS Wash. 1989.

The HM HEC, nonionic and hydrosoluble, can be prepared from HEC or hydroxyethylcellulose, through the chemical incorporation of a long alkyl chain between $C_4$ and $C_{25}$, preferably between 8 and 18 carbon atoms for the hydrophobic unit.

The hydrophobic unit is bound to the cellulose by an ether or ester bond, preferably an ether bond because this type of bond is more stable when the polymer is in aqueous solution.

The concentration of hydrophobic units can range from 0.2 to about 5%, preferably from 0.2 to 1.5% and more specifically between 0.2 and 1%.

The polymer HM HEC can have a hydroxyethyl unit molar substitution rate of at least 1.5, preferably between 1.5 and 4, i.e. from 1.5 to 4 moles of hydroxyethyl substituents per anhydroglucose unit, and a relatively low molecular mass, i.e. less than 2,000,000 daltons and preferably between 20,000 and 500,000 (that is to say a degree of polymerization of 75 to 1800).

The fluid according to the present invention also includes a useful amount of a polymer called HM PAM, resulting from the polymerization of hydrophilic units with a hydrophobic unit. The hydrophilic unit contains:

acrylamide according to the following formula:

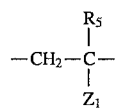

where $R_5$ is H or $CH_3$, and $Z_1$ is $CONH_2$,
and possibly acrylic acid, acrylate or sulfonate comonomers according to the following formula:

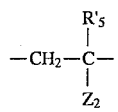

where $R'_5$ is H or $CH_3$, and $Z_2$ is COOH or COO—, $M^+$ or $CONHR_1SO_3$—, $M^+$; $R_1$ is H or a $C_1$–$C_{30}$ alkyl, aryl or alkyl-aryl radical.

The hydrophobic unit of the polymer HM PAM can then have one of the following forms: N-alkylacrylamide, alkylacrylate, N-substituted acrylamide or a substituted acrylate, the substituted part being a nonionic surfactant, said hydrophobic unit having the general formula as follows:

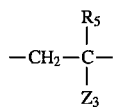

where $R_5$ is H or $CH_3$, and $Z_3$ is $COOR_7$, $COOR_2$, $CONR_1R_2$, or $CONR_1R_7$, $R_7$ being a nonionic surfactant and $R_2$ a $C_1$–$C_{30}$ alkyl, aryl or alkyl-aryl radical; $R_1$ is H or a $C_1$–$C_{30}$ alkyl, aryl or alkyl-aryl radical.

The hydrosoluble polymers HM PAM are obtained by copolymerization of hydrosoluble monomers with a hydrophobic monomer in a hydrophilic/ hydrophobic molar ratio from 90/10 to about 99.995/0.005, preferably from 95/5 to about 99.9/0.1. Their molecular mass is greater than $10^6$ daltons.

The polymer HM PAM is referred to as H1PAM when it is an acrylamide and nonyl methacrylate copolymer (i.e. $R_5$ is $CH_3$; $Z_3$ is $COOR_7$ with $R_7=C_9H_{19}$), when it has a molecular mass of about 8 $10^6$ daltons and a concentration of hydrophobic units ranging between 0.5 and 1.5%.

The combination of these three polymers, Hb1, HM PAM and the hydrophobically modified cellulose derivative, provides the fluid according to the invention with good characteristics as a well fluid, i.e. a fluid which can be used for drilling, completion and workover operations in a well. Furthermore, the applicant has selected a fourth polymer of the polysaccharide type whose addition to the formulation according to the invention notably allows the fluid rheology to be optimized while enhancing certain qualities of the formulation. Preferably, the polysaccharides having a double or triple helical rigid or semirigid molecular structure are suited to the formulation including the other three polymers. It can be for example scleroglucan or xanthan.

DETAILED DESCRIPTION OF THE INVENTION

The present invention thus relates to a fluid used in a well drilled through at least one permeable geologic formation. The fluid contains in aqueous solution an effective amount of:

a) a polymer called Hb1, defined above, b) a polymer called HM PAM, defined above, c) a hydrophobically modified cellulose derivative, d) a polymer of the polysaccharide type having a double or triple helical rigid or semirigid molecular structure.

The polymer Hb1 can have for x about the value of 0.8, $R_4$ can include four carbon atoms and the polymer can have a molecular mass ranging between $10^4$ and 5 $10^4$ daltons, and preferably close to 1.7 $10^4$ daltons.

The polymer HM PAM can have a molecular mass ranging between $10^6$ and $10^7$ daltons and a concentration of hydrophobic units ranging between 0.5 and 5%.

The polymer HM PAM, when called H1PAM, can have $R_5=CH_3$, $Z_3=COOR_2$ with $R_2=C_9H_{19}$, a molecular mass of about 8 $10^6$ daltons and a concentration of hydrophobic units ranging between 0.5 and 1.5%.

The cellulose derivative can be hydrophobically modified hydroxyethylcellulose.

The modified hydroxyethylcellulose can include a hydrophobic alkyl radical including between 4 and 25 carbon atoms, and preferably between 8 and 18.

The molecular mass of the modified hydroxyethylcellulose can be less than 2,000,000 daltons and it preferably ranges between 20,000 and 500,000 daltons.

The polymer of the polysaccharide type can be selected from the group made up of xanthan and scleroglucan.

The fluid can comprise at least one electrolyte at concentrations which can reach saturation.

The electrolyte can be selected from the group made up of sodium, potassium, calcium, magnesium or zinc chloride, bromide, carbonate, acetate, formate, sulphate, silicate, phosphate.

The fluid can contain between 0.5 and 30 g/l of Hb1, of hydrophobically modified cellulose derivative, of HM PAM and between 0.5 and 20 g/l of polymer of the polysaccharide type.

The fluid contain between 0.5 and 10 g/l of H3, of HM HEC and of H1PAM, between 1 and 5 g/l of polysaccharide type polymer, preferably xanthan, between 5 and 100 g/l of KCl or NaCl and between 0 and 30 g/l of reactive clay.

The invention relates to a process implemented in a well drilled through at least one geologic formation having a certain permeability, the process comprising at least one of the following operations: well drilling, well completion, workover operation in a well. The process utilizes a fluid containing in aqueous solution an effective amount of:

a) a polymer called Hb1, defined above, b) a polymer called HM PAM, c) a hydrophobically modified cellulose derivative, d) a polymer of the polysaccharide type.

In the process, in which said geologic formation includes reactive clays, it is possible to control the swelling inhibition and/or the dispersion of said clays by said fluid by optimizing the amount of polymer Hb1.

The fluid rheology can be adjusted by optimizing the amount of polymer of the polysaccharide type.

The filtration reduction can be controlled by optimizing the amount of hydrophobically modified cellulose derivative.

The capacity of the fluid not to break up cuttings can be adjusted by optimizing the amount of HM PAM in said fluid.

In the process, the formulation of said fluid may not include an addition of reactive clays.

The process can be applied to slim-hole drilling or to strongly deviated drilling with respect to the vertical.

The advantages and the features of the fluid according to the present invention will be clear from reading the tests described hereafter. The fluids tested have been systematically homogenized in an agitator of the Hamilton Beach type.

It is shown that the different components of the formulation of the fluid according to the invention have primary properties and most of them have the effect of enhancing the primary property of at least one other component. The applicant has established multiple synergistic effects between the components of the fluid.

TEST No. 1: SWELLING INHIBITION

The polymer Hb1 is described in application FR-A-2,686,892 and its capacities as a swelling inhibitor are demonstrated therein by tests performed with the polymer H3.

The following test has been carried out in an equipment for measuring the swelling of a rock. It includes an enclosure filled with the fluid tested in which an about 3-cm long and 2-cm diameter sample of a clayey material is placed. The sample is entirely immersed in the fluid. A displacement transducer fastened to the frame of the equipment measures the displacement of a point as a function of time, the point being pressed on the sample. The tests last for about 8 to 10 hours. A stabilization of the swelling of the sample is observed after about 3 to 4 hours. The sample is made of a clayey material called "Pierre 1 shale" containing about 10% of smectite, 30% of illite and 1% of kaolinite, whose water activity is about 0.9.

The table hereafter shows the results obtained comparatively in the presence of four solutions:

S1: distilled water,

S2: solution containing xanthan (2 g/l), HM HEC (2 g/l) and H1PAM (2 g/l), KCl (50 g/l), S3: solution containing H3 (4 g/l), xanthan (2 g/l), HM HEC (2 g/l) and H1PAM (2 g/l), KCl (50 g/l),

| S4:solution containing H3 (4 g/l), KCl (5 g/l). | | | | |
|---|---|---|---|---|
| Formulations | S1 | S2 | S3 | S4 |
| Linear expansion % | 9.4 | 4.6 | 4.3 | 4.5 |

It is confirmed that the formulation S3, corresponding to a variant according to the invention, has good swelling inhibition capacities. It can be observed that, at the end of the test, the sample in fluid S1 has no mechanical strength.

Another test has been carried out under much more reactive conditions. A sample of Green Bond montmorillonite is brought into contact with different solutions. The sample has the form of a clay pellet compacted at a pressure of 100 to 1500 bars. The pellet used has an activity of 0.5. The activity of the electrolyte used ranges between 1 and 0.96. The test conditions are as follows: temperature of 30° C., solid/liquid ratio equal to 0.1 with a mild stirring and swelling kinetics followed over 3 h.

The expansion of the pellet is measured, the results are expressed as a percentage.

Formulations S1, S3 and S4 defined above have also been used for this test, as well as a formulation S5 containing only 50 g/l of KCl:

| Formulations | S1 | S3 | S4 | S5 |
|---|---|---|---|---|
| Linear expansion % | * | 40 | 300 | * |

*Total disintergration of the pellet.

The results show that for a much more reactive pellet than the sample of the first test which contains only 10% of smectite and under activity unbalance conditions between the pellet and the electrolyte, the swelling inhibition capacities of formulation S3 are at least as good as for the H3 alone, if these results are related to the same salinity conditions. In the presence of distilled water or of a solution containing 50 g/l of KCl, the pellet is entirely disintegrated, which shows its very high reactivity.

TEST No. 2: CUTTINGS DISPERSION

This test allows the capacity of a drilling, a completion or a workover fluid not to destroy the cohesion of a solid in suspension in the fluid, notably a piece of a geological formation called a cutting. This function is generally referred to as the capacity of a fluid not to break up cuttings (solid debris). The interest of this function is notably to limit the rate of fine particles in order; not to change the rheological properties of the fluid, to promote the separation of solids in the surface installations, and to speed up the cleaning of the well.

Description of the test procedure

Most of the tests have been carried out on cuttings or pieces of a clay called "London Clay" of a size ranging between 1 mm and 2.8 mm, kept in a desiccator so that their water activity is of the order of 0.9. The London Clay contains about 23% of smectite, 29% of illite and 11% of kaolinite.

Three grams of clay are introduced into a 300-cm$^3$ cell containing 100 cm$^3$ of the fluid to be tested. Four 16-mm diameter steel balls are then introduced into the cell. This cell is placed on a rotating system for an hour at a temperature of 30° C.

The fluid is then screened through two sieves in series whose respective mesh size is 1 mm and 0.25 mm. The clay is recovered on each of the sieves. After drying, the clay recovered is weighted.

The results are expressed as a percentage by weight of clay recovered on each sieve with respect to the initial weight of clay suspended.

Test No. 1: Comparison of the different formulations

The table hereunder groups together the results obtained with four formulations. In relation to a standard simple formulation F1, the test clearly brings out the good results obtained with the formulation F2 and especially with formulation F3 combining H3, H1PAM and HM HEC.

Formulations

F1: Xanthan (4 g/l), CMCLV (10 g/l), KCl (50 g/l)

F2: Xanthan (4 g/l), H3 (4 g/l), CMCLV (10 g/l), H1PAM (2 g/l), KCl (50 g/l)

F3: Xanthan (4 g/l), H3 (4 g/l), HM HEC (4 g/l), H1PAM (3 g/l), KCl (50 g/l)

F4: Xanthan (4 g/l), CMCLV (10 g/l), H3 (4 g/l), KCl (50 g/l).

| Formulations | F1 | F2 | F3 | F4 |
|---|---|---|---|---|
| % of cuttings recovered of size d >1 mm | 16 | 42 | 84 | 16 |
| % of cuttings recovered of size d (1 mm > d > 0.25 mm) | 80 | 50 | 10 | 80 |

The comparison of tests 1 and 4 shows that H3 has no notable influence on the dispersion of the cuttings.

The comparison of tests 2 and 3 shows that the combination of HM HBC with H1PAM promotes a higher cuttings resistance. This seems to be due notably to the interactions between the two polymers which allow thereby a better encapsulation of the cuttings and therefore prevent their dispersion.

Test No. 2: Influence of the hydrophobically modified polyacrylamide (H1PAM) concentration The influence of the H1PAM concentration has been studied in this series of tests.

Base formulation: H3 (4 g/l), xanthan (2 g/l), HM HEC (4 g/l), KCl (50 g/l).

Different H1PAM concentrations are added to this base formulation.

| H1PAM concentration (g/l) | 0 | 0.5 | 1 | 2 | 3 |
|---|---|---|---|---|---|
| % of cuttings recovered of size d > 1 mm | 2 | 45 | 55 | 71 | 84 |
| % of cuttings recovered of size d (1 mm > d > 0.25 mm) | 97 | 50 | 39 | 18 | 10 |

It is clear that the influence of H1PAM on the good results obtained by this type of test is strong. It seems that the H1PAM concentration optimum ranges between 2 and 4 g/l under these conditions.

Test No. 3: Cuttings dispersion test carried out on recompacted bentonite pellets (100% of Wyoming montmorillonite): a very reactive model shale Cuttings consisting of recompacted bentonite pellets have been used in this series. The cell containing the clay+formulation suspension is kept in rotation for 16 hours. No ball is introduced in the cell. The clay used is a Wyoming montmorillonite containing exchangeable caTions of 70% Na, 30% Ca composition. The original pellets have a cylindrical shape (height=5 mm, diameter=5 mm) and are prepared by compacting the clay in a press at 4 to 5 t/cm$^2$. Their water activity is then about 0.5. The results are expressed as a percentage by weight of cuttings recovered of a size greater than 3.15 mm.

Base formulation: Xanthan (2 g/l), KCl (50 g/l).

Different agents given in the table hereunder are added to this base formulation.

| Products added to the base formulation | % of cuttings recovered (d > 3.15 mm) |
|---|---|
| nothing | 0 |
| CMCLV (10 g/l) + H3 (4 g/l) | 3 |
| Glycol (40 g/l) | 2 |
| PHPA (2 g/l) | 17 |
| H1PAM (2 g/l) + H3 (4 g/l) | 18 |
| HM HEC (4 g/l) + H3 (4 g/l) | 4 |
| H1PAM (2 g/l) | 17 |

The CMC LV is a product manufactured by the Aqualon company.

PHPA is a partially hydrolyzed polyacrylamide manufactured by the SNF Floerger company.

These results confirm that even with a very reactive system, the behaviour of a fluid containing H1PAM is good.

TEST No. 3: CONTAMINATION THROUGH THE SOLIDS

These tests assess the behaviour of the fluid according to the invention in the presence of non-prehydrated bentonite. They measure the evolution of the viscosity (mPa.s) of the fluid, for different shear gradients (s$^{-1}$) and different bentonite ratios (g/l). These measurings are carried out with a conventional viscosimeter of the FANN type.

The fluid contains: Xanthan (2 g/l), H3 (4 g/l), HM HEC (4 g/l), H1PAM (2 g/l), KCl (5%).

| Bentonite content (g/l) | 0 | 21 | 105 | 160 |
|---|---|---|---|---|
| Shear rate (s$^{-1}$) | | | | |
| 17 | 270 | 300 | 380 | 380 |
| 170 | 65 | 70 | 82 | 85 |
| 1021 | 23 | 28 | 31 | 32 |

The following test allows a comparison to be established with a formulation of a conventional water-base fluid containing xanthan (4 g/l), CMC (10 g/l) and KCl (50 g/l).

| Bentonite content (g/l) | 0 | 21 | 105 | 160 |
|---|---|---|---|---|
| Shear rate (s$^{-1}$) | | | | |
| 17 | 270 | 300 | 420 | 440 |
| 170 | 55 | 55 | 60 | 65 |
| 1021 | 23 | 24 | 28 | 32 |

It can be noted, by comparing the two formulations, that the first formulation, which corresponds to one of the variants of the fluid of the invention, displays better behaviour during contamination by solids. In particular, the viscosity increase with the increase of the contaminating solids percentage, measured for low shear rates, is much lower and even reaches a plateau with the first formulation, unlike the second formulation corresponding to a conventional water-base formulation. This places less demand on fluid surface reprocessing and is expected to reduce mud dilution. The operating cost can thus be reduced when using the novel formulation.

TEST No. 4: FILTRATE CONTROL

Test No. 1: Comparison with formulations containing conventional filtrate reducers (CMC LV and HEC)

The base fluid contains xanthan (4 g/l), H3 (4 g/l), KCl (5%) and a filtrate reducer: CMC LV, HEC or HM HEC.

The viscosity VP is expressed in milli Pascal.second (mPa.s), the yield value YV in a usual unit, i.e. in lb/100 ft$^2$. The YV results must be multiplied by 0.4788 to obtain a value in Pa.

| Filtrate reducer | CMCLV | HEC | HM HEC |
|---|---|---|---|
| Concentration (g/l) | 10 | 2 | 4 |
| API filtrate - 7'30 (cm$^3$) | 97 | 292 | 61 |
| API filtrate - 30' (cm$^3$) | 102 | 318 | 69 |
| VP (mPa.s) | 13 | 11 | 16 |
| YV (lb/100 ft$^2$) | 14.5 | 15.5 | 14 |

It can be noted that the use of HM HEC allows the filtrate to be strongly reduced in the formulations without solids.

Test No. 2: Influence of the HM HEC concentration

The base fluid contains xanthan (2 g/l), H3 (4 g/l), HM HEC (0, 2 or 4 g/l), H1PAM (2 g/l) and Chaillac barite for a density d=1.2.

Without departing from the scope of the present invention, conventional weighting products other than barite, such as calcium carbonate, pyrite, galena, can be used.

| HM HEC concentration (g/l) | 0 | 2 | 4 |
|---|---|---|---|
| API filtrate - 7'30 (cm$^3$) | 4.5 | 3.1 | 2.7 |
| API filtrate - 30' (cm$^3$) | 8.6 | 5.7 | 5 |
| VP (mPa.s) | 12 | 12 | 13 |
| YV (lb/100 ft$^2$) | 3 | 7 | 11 |

In the tests, the cake thickness is less than 1 mm. The presence of HM HEC allows the filtrate to be reduced for a concentration ranging between 2 and 4 g/l.

It can be noted that the value of the filtered volume is particularly low in spite of the absence of clay. It is well-known that a relatively impermeable wall cake consists of a network of clay particles and of polymers. Now, the formulation tested here under the present conditions allows the formation of such a network in the absence of clay. The polymer/polymer hydrophobic interactions allow such a network to form here in the absence of clay.

Test No. 3: Influence of the presence of H1PAM

The fluid contains xanthan (2 g/l), H3(4 g/l), HM HEC (2 g/l), HM PAM (0 and 2 g/l) and Chaillac barite in order to obtain a density d=1.2.

| H1PAM concentration (g/l) | 0 | 2 |
|---|---|---|
| API filtrate - 7'30 (cm$^3$) | 3.6 | 3.1 |
| API filtrate - 30' (cm$^3$) | 7.6 | 5.7 |
| VP (mPa.s) | 18 | 12 |
| YV (lb/100 ft$^2$) | 2 | 7 |

In both tests, the cake thickness is less than 1 mm.

It can be noted that the combination of HM HEC and HM PAM allows a better filtrate reduction control to be obtained.

TEST No. 5: INFLUENCE OF THE VISCOSIFYING PRODUCT CONCENTRATION

The fluid contains xanthan as a viscosity control additive, H3 (4 g/l), HM HBC (4 g/l), H1PAM (2 g/l), KCl (5%).

| Xanthan concentration (g/l) | 4 | 2 |
|---|---|---|
| API filtrate - 7'30 (cm$^3$) | — | 52 |
| API filtrate - 30' (cm$^3$) | — | 60 |
| VP (mPa.s) | 17 | 13 |
| YV (lb/100 ft$^2$) | 21 | 11 |

The presence of H1PAM allows the amount of xanthan in the formulation to be decreased. This is advantageous, especially in relation to the cost of the mud.

TEST No. 6: INFLUENCE OF SALINITY

The fluid contains xanthan (2 g/l), H3 (4 g/l), HM HEC (2 g/l), H1PAM (2 g/l), KCl (5%) and Chaillac barite in order to obtain a density d=1.2.

Composition of the tap water: Ca 150 ppm.

Composition of the reconstituted seawater: NaCl (26.62 g/l), KCl (0.75 g/l), CaCl$_2$, 2H$_2$O (1.616 g/l), MgCl$_2$, 6H$_2$O (5.27 g/l), MgSO$_4$, 7H$_2$O (7.394 g/l). The polymers are dispersed directly in the reconstituted seawater.

|  | (A) | (B) | (C) |
|---|---|---|---|
| API filtrate - 7'30 (cm$^3$) | 3.1 | 3.1 | 2.2 |
| API filtrate - 30' (cm$^3$) | 5.7 | 5.4 | 4.7 |
| VP (mPa.s) | 12 | 20 | 13 |
| YV (lb/100 ft$^2$) | 7 | 5 | 6 |

(A): distilled water + KCl 5%
(B): tap water + KCl 5%
(C): reconstituted seawater.

The cake thickness is less than 1 mm in all the cases. The filtrate reduction is good whatever the salinity.

TEST No. 7: INFLUENCE OF BARITE (d=1.2, KCl (5%)

The fluid contains xanthan (2 g/l), H3 (4 g/l), HM HEC (2 g/l), H1PAM (2 g/l).

The average grain size of the barites used for the test is 20 micrometers for the Chaillac barite and 8 micrometers for the barite marketed by Schlumberger Dowell.

| Barite type | Chaillac | IDF |
|---|---|---|
| API filtrate - 7'30 (cm$^3$) | 3.1 | 2.7 |
| API filtrate - 30' (cm$^3$) | 5.7 | 5.9 |
| VP (mPa.s) | 14 | 12 |
| YV (lb/100 ft$^2$) | 7 | 8 |

In both cases, the cake thickness is of the order of 0.5 mm.

TEST No. 8: INFLUENCE OF THE BARITE CONTENT

The base fluid contains xanthan (2 g/l), H3 (4 g/l), HM HEC (2 g/l), H1PAM (2 gl). The barite used is Chaillac barite.

| Barite concentration (g/l) | 30 | 210 |
|---|---|---|
|  | (d = 1.07) | (d = 1.2) |
| API filtrate - 7'30 (cm$^3$) | 4.2 | 3.1 |
| API filtrate - 30' (cm$^3$) | 7.2 | 5.7 |
| VP (mPa.s) | 10 | 14 |
| YV (lb/100 ft$^2$) | 6 | 7 |

In both cases, the cake thickness is of the order of 0.5 mm.

This test shows that, in the presence of a low amount of solid particles such as barite, the filtrate volume is very low. Similarly, the presence of a drilled solids content, even low, allows a low filtrate volume to be obtained.

TEST No. 9: INFLUENCE OF THE FILTERING TEMPERATURE

The base fluid contains xanthan (2 g/l), H3 (4 g/l), HM HEC (2 g/l), H1PAM (2 g/l) and Chaillac barite for a density d=1.2.

| Temperature (°C.) | 30 | 90 | 120 |
|---|---|---|---|
| API filtrate - 7'30 (cm$^3$) | 3.1 | 9.2 | 8.1 |
| API filtrate - 30' (cm$^3$) | 5.7 | 18.5 | 15.8 |
| VP (mPa.s) | 14 | — | — |
| YV (lb/100 ft$^2$) | 7 | — | — |
| Cake thickness (mm) | 0.5 | 2.5 | 1.5 |

It is well-known that most of the polymer-base fluids have a viscosity which decreases with the temperature, which leads to an increase of the volume filtered with the temperature rise, especially above 50° C. On the contrary, the formulation according to the invention shows that the volume filtered remains acceptable, even at 120° C. It seems that the enhancements of the hydrophobic interactions with the temperature rise allow this effect to be overcome.

TEST No. 10: INFLUENCE OF TEMPERATURE

The fluid contains xanthan (2 g/l), H3 (4 g/l), HM HEC (4 g/l), H1PAM (2 g/l), KCl5%.

Aging takes place under static conditions in a Baroid type cell, for 24 hours and in the presence of oxygen.

Variation of the relative viscosity $\mu_r$ with respect to the initial viscosity $\mu_{r0}$ measured at 30° C.:

| Temperature | $\mu_r/\mu_{r0}$ |
|---|---|
| 90° C. | 1 |
| 120° C. | 0.84 |
| 140° C. | 0.23 |
| 160° C. | 0.1 |

A very high stability of the formation tested is observed at 120° C. The degradation observed for higher temperatures is due to the well-known property of xanthan to dissociate when submitted to temperature. The degradation of xanthan occurs in the region of 120° C. according to the salinity conditions.

We claim:

1. A fluid suitable for use in a well drilled through at least one permeable geologic formation, comprising in aqueous solution an effective amount of:

a) a water soluble polymer called Hb1 having a -(Hb)-(Hy)-type structure with a statistical distribution, said structure resulting from the radical polymerization of an $C_1$–$C_{30}$ acrylate/alkylacrylate copolymer corresponding to the following formula:

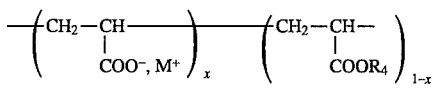

where x ranges between 0.4 and 0.8, where M is H or Na or K or any other monovalent ion $R_4$ is $C_1$–$C_{30}$ alkyl, aryl or alkyl-aryl radical, and where the length of the hydrophobic units $R_4$ is selected as a function of the molecular mass of said polymer according to the following rules:

for a polymer having a molecular mass less than about $10^5$ daltons, $R_4$ contains at least two carbon atoms, for a polymer having a molecular mass ranging between about $10^5$ and $2.5 \cdot 10^6$ daltons, $R_4$ contains at least four carbon atoms, b) a water soluble polymer called HM PAM, resulting from the polymerization of hydrophilic units with a hydrophobic unit, the hydrophilic unit includes: acrylamide according to the following formula:

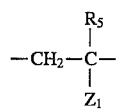

where $R_5$ is H or $CH_3$, and $Z_1$ is $CONH_2$, and optionally acrylic acid, acrylate or sulfonate comonomers according to the following formula:

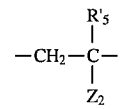

where $R'_5$ is H or $CH_3$, and $Z_2$ is COOH or COO—, $M^+$ or $CONHR_1SO_3$—, $M^+$; $R_1$ is H or a $C_1$–$C_{30}$ alkyl, aryl or alkyl-aryl radical, said hydrophobic unit having the general formula as follows:

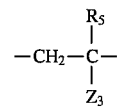

where $R_5$ is H or $CH_3$, and $Z_3$ is $COOR_7$, $COOR_2$, $CONR_1R_2$, or $CONR_1R_7$, $R_7$ being a nonionic surfactant and $R_2$ a $C_1$–$C_{30}$ alkyl, aryl or alkyl-aryl radical, $R_1$ is H or a $C_1$–$C_{30}$ alkyl, aryl or alkyl-aryl radical, c) a hydrophobically modified cellulose derivative, d) a polysaccharide type polymer having a double or triple helical rigid or semirigid molecular structure.

2. A fluid as claimed in claim 1, wherein the polymer Hb1 has for x about the value of 0.8, $R_4$ includes four carbon atoms and said polymer has a molecular mass ranging between $10^4$ and 5 daltons, the resultant polymer being called $H_3$.

3. A fluid as claimed in claim 1, wherein the polymer HM PAM has a molecular mass ranging between $10^6$ and $10^7$ daltons and a concentration of hydrophobic units ranging between 0.5 and 5%.

4. A fluid as claimed in claim 3, wherein the polymer HM PAM has $R_5=CH_3$, $Z_3=COOR_2$ with $R_2=C_9H_{19}$, resulting in a polymer called H1PAM, and has a molecular mass of about $8 \cdot 10^6$ daltons and a concentration of hydrophobic units ranging between 0.5 and 1.5%.

5. A fluid as claimed in claim 1, wherein said cellulose derivative is a hydrophobically modified hydroxyethylcellulose.

6. A fluid as claimed in claim 5, wherein the modified hydroxyethylcellulose includes a hydrophobic alkyl radical including between 4 and 25 carbon atoms.

7. A fluid as claimed in claim 5, wherein the molecular mass of the modified hydroxyethylcellulose is less than 2,000,000 daltons.

8. A fluid as claimed in claim 1, wherein the polysaccharide type polymer is xanthan or scleroglucan.

9. A fluid as claimed in claim 1, comprising at least one electrolyte at concentrations which may reach saturation.

10. A fluid as claimed in claim 9, wherein said electrolyte is a sodium, potassium, calcium, magnesium or zinc chloride, bromide, carbonate, acetate, formate, sulphate, silicate, or phosphate.

11. A fluid as claimed in claim 1, comprising between 0.5 and 30 g/l of Hb1, of a hydrophobically modified cellulose derivative, of HM PAM and between 0.5 and 20 g/l of the polysaccharide type polymer.

12. A fluid as claimed in claim 11, comprising between 0.5 and 10 g/l of H3, of HM HEC and of H1PAM, between 1 and 5 g/l of polysaccharide type polymer, between 5 and 100 g/l of KCl or NaCl and between 0 and 30 g/l of reactive clay.

13. A process implemented in a well drilled through at least one geologic formation having a certain permeability, said process comprising at least one of the following operations: well drilling, well completion, workover operation in a well, characterized in that a fluid as claimed in claim 1 is used.

14. A process as claimed in claim 13, wherein said geologic formation includes reactive clays, characterized in that the swelling inhibition and/or the dispersion of said clays by said fluid is controlled by optimizing the amount of polymer Hb1.

15. A process as claimed in claim 13, wherein the rheology of said fluid is adjusted by optimizing the amount of polysaccharide type polymer.

16. A process as claimed in claim 13, wherein the filtration reduction is controlled by optimizing the amount of hydrophobically modified cellulose derivative.

17. A process as claimed in claim 13, wherein the capacity of the fluid not to crumble cuttings is controlled by optimizing the amount of HM PAM in said fluid.

18. A process as claimed in claim 13, wherein the formulation of said fluid does not comprise addition of reactive clays.

19. A process as claimed in claim 18 wherein said well is formed by slim-hole drilling or by strongly deviated drilling with respect to the vertical.

20. A fluid as claimed in claim 2, wherein the polymer has a molecular mass of about $1.7 \, (10^4)$ daltons.

21. A fluid as claimed in claim 6, wherein the hydrophobic alkyl radical contains between 8 and 18 carbon atoms.

22. A fluid as claimed in claim 7, wherein the molecular mass of the modified hydroxycellulose is between 20,000 and 500,000 daltons.

23. A fluid as claimed in claim 12, wherein the polysaccharide is xanthan.

24. A fluid suitable for use in a well drilled through at least one permeable geologic formation, comprising in aqueous solution an effective amount of:

a) a water-soluble polymer called Hb1 having a -(Hb)-(Hy)- type structure with a statistical distribution, said structure resulting from the radical polymerization of an $C_1$–$C_{30}$ acrylate/alkylacrylate copolymer corresponding to the following formula:

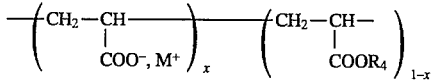

wherein x is about the value of 0.8, $R_4$ includes four carbon atoms and said polymer has a molecular mass ranging between $10^4$ and 5 daltons, the resultant polymer being called H3, b) a water-soluble polymer called H1PAM, resulting from the polymerization of hydrophilic units with a hydrophobic unit, the hydrophilic unit including:

acrylamide moieties according to the following formula:

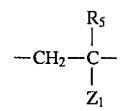

wherein $R_5$ is H or $CH_3$, and $Z_1$ is $CONH_2$, and optionally acrylic acid, acrylate or sulfonate comonomers according to the following formula:

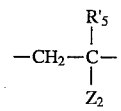

where $R'_5$ is H or $CH_3$, and $Z_2$ is COOH or $COO^-$, $M^+$; $R_1$ is H or a $C_1$–$C_{30}$ alkyl, aryl, or alkyl-aryl radical, said hydrophobic unit having the formula:

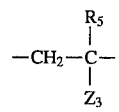

wherein
$R_5$ is $CH_3$
$Z_3$ is $COOR_2$
$R_2$ is $C_9H_{19}$
H1PAM having a molecular mass of about $8 \, 10^6$ daltons and a concentration of hydrophobic units ranging between 0.5 and 1.5%;

c) a hydrophobically modified hydroxyethyl cellulose having a hydrophobic alkyl radical of 4–25 carbon atoms, and a molecular mass of between 20,000 and 500,000 daltons;

d) xanthan or scleroglucan; and e) KCl or NaCl the proportion of a), b), c), d), and e) in grams per liter of solution being between 0.5 and 10 g/l for each of a), b), and c) between 1 and 5 g/l of d), and between 5 and 100 g/l or e).

* * * * *